United States Patent
Islam et al.

(10) Patent No.: US 8,127,116 B2
(45) Date of Patent: Feb. 28, 2012

(54) DEPENDENCY MATRIX WITH REDUCED AREA AND POWER CONSUMPTION

(75) Inventors: Saiful Islam, Austin, TX (US); Mary D. Brown, Austin, TX (US); Bjorn P. Christensen, Round Rock, TX (US); Sam G. Chu, Round Rock, TX (US); Robert A. Cordes, Austin, TX (US); Maureen A. Delaney, Burlington, VT (US); Jafar Nahidi, Round Rock, TX (US); Joel A. Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/417,768

(22) Filed: Apr. 3, 2009

(65) Prior Publication Data

US 2010/0257336 A1    Oct. 7, 2010

(51) Int. Cl.
   *G06F 9/30*    (2006.01)
(52) U.S. Cl. .................................. 712/217; 712/216
(58) Field of Classification Search ............ 712/14, 712/216, 217; 711/118, 119, 120, 129, 131
   See application file for complete search history.

(56) References Cited

U.S. PATENT DOCUMENTS

| | | | |
|---|---|---|---|
| 5,793,686 A * | 8/1998 | Furutani et al. ............... 365/201 |
| 5,809,562 A * | 9/1998 | Gaskins et al. ............... 711/207 |
| 5,900,012 A * | 5/1999 | Tran .............................. 711/120 |
| 5,937,202 A | 8/1999 | Crosetto |
| 6,016,540 A * | 1/2000 | Zaidi et al. ..................... 712/214 |
| 6,065,105 A | 5/2000 | Zaidi et al. |
| 6,216,200 B1 * | 4/2001 | Yeager .......................... 711/100 |
| 6,334,182 B2 | 12/2001 | Merchant et al. |
| 6,463,523 B1 | 10/2002 | Kessler et al. |
| 6,557,095 B1 * | 4/2003 | Henstrom ...................... 712/216 |
| 6,604,190 B1 | 8/2003 | Tran |
| 6,862,676 B1 | 3/2005 | Knapp et al. |
| 6,988,185 B2 | 1/2006 | Stark, IV et al. |
| 7,549,095 B1 * | 6/2009 | Alexander et al. ............ 714/709 |
| 7,551,645 B2 * | 6/2009 | Gulati et al. ................... 370/474 |
| 7,603,592 B2 * | 10/2009 | Sekiguchi et al. ............. 714/710 |
| 2003/0026135 A1 * | 2/2003 | Hill et al. .................. 365/189.02 |
| 2008/0239860 A1 | 10/2008 | Chu et al. |
| 2008/0250232 A1 * | 10/2008 | Nakashima .................... 712/225 |
| 2008/0279015 A1 | 11/2008 | Chu et al. |
| 2009/0328057 A1 * | 12/2009 | Lahav et al. ................... 718/106 |
| 2010/0058033 A1 * | 3/2010 | Abernathy et al. ........... 712/216 |

(Continued)

OTHER PUBLICATIONS

Abts, et al., "The Cray Black Widow: a Highly Scalable Vector Multiprocessor", SCO7 Nov. 2007, ACM Digital Library.

(Continued)

*Primary Examiner* — Aimee Li
(74) *Attorney, Agent, or Firm* — Patrick E. Caldwell, Esq.; The Caldwell Firm, LLC

(57) ABSTRACT

A processor having a dependency matrix comprises a first array comprising a plurality of first cells. A second array couples to the first array and comprises a plurality of second cells. A first write port couples to the first array and the second array and writes to the first array and the second array. A first read port couples to the first array and the second array and reads from the first array and the second array. A second read port couples to the first array and reads from the first array. A second write port couples to the second read port, reads from the second read port and writes to the second array.

18 Claims, 4 Drawing Sheets

U.S. PATENT DOCUMENTS

2010/0058035 A1* 3/2010 Abernathy et al. ............ 712/217
2010/0250902 A1* 9/2010 Abernathy et al. ............ 712/216

OTHER PUBLICATIONS

Barnes, et al., "'Flea-flicker' Multipass Pipelining: an Alternative to the High-Power Out-of-Order Offense", Proceedings of the 38th Annual IEEE/ACM International Symposium on Microarchitecture (MICRO'05), 2005, IEEE.

Bai, et al., "A Low-Power In-Order/Out-of-Order Issue Queue", ACM Transactions on Architecture and Code Optimization, vol. 1, No. 2, Jun. 2004, pp. 152-179, ACM.

Carter, et al., "Using Predicate Path Information in Hardware to Determine True Dependences", ICS'02, Jun. 22-26, 2002, New York, New York, USA, ACM.

Conti, et al., "Design and performance evaluation of a MAC protocol for wireless local area networks", Mobile Networks and Applications 2 (1997), pp. 69-87, Baltzer Science Publishers.

Sassone, et al., "Matrix Scheduler Reloaded", ISCA'07, Jun. 9-13, 2007, San Diego, California, USA, ACM.

Sassone, et al., "Static Strands: Safely Exposing Dependence Chains for Increasing Embedded Power Efficiency," ACM Transactions on Embedded Computing Systems, vol. 6, No. 4, Article 24, Sep. 2007, ACM.

Sha, et al., "Scalable Store-Load Forwarding via Store Queue Index Prediction", Proceedings of the 38th Annueal IEEE/ACM International Symposium on Microarchitecture (Micro'05), 2005, IEEE.

Vivekanandham, et al., "A Scalable Low Power issue Queue for Large Instruction Window Processors", ICS06, Jun. 28-30, 2006, Cairns, Queensland, Australia, ACM.

* cited by examiner

DEPENDENCY MATRIX WITH REDUCED AREA AND POWER CONSUMPTION

This invention was made with United States Government support under Agreement No. HR0011-07-9-0002 awarded by DARPA. The Government has certain rights in the invention.

TECHNICAL FIELD

The present invention relates generally to the field of computer processing and instruction scheduling and, more particularly, to a system and method for a dependency matrix with reduced area and power consumption.

BACKGROUND

Modern electronic computing systems, such as microprocessor systems, typically include a processor and datapath configured to receive and process instructions. Certain systems allow for out of order instruction execution, wherein instructions can issue and be executed out of their order in the underlying program code. An out of order execution system must account for dependencies between instructions.

Generally, a dependency occurs where an instruction requires data from sources that are themselves the result of another instruction. For example, in the instruction sequence:
ADD $8, $7, $5
SW $9, (0)$8
The ADD (add) instruction adds the contents of register $7 to the contents of register $5 and puts the result in register $8. The SW (store word) instruction stores the contents of register $9 at the memory location address found in $8. As such, the SW instruction must wait for the ADD instruction to complete before storing the contents of register $8. The SW instruction therefore has a dependency on the ADD instruction. The illustrated dependency is also known as a read-after-write (RAW) dependency.

One common approach to tracking dependencies is a "dependency matrix," such as that described in U.S. Pat. Nos. 6,065,105 and 6,334,182. Generally, a conventional dependency matrix includes rows and columns. Each bit or element, i.e., the intersection of one row and one column, corresponds to a dependency of an instruction in the issue queue. Each instruction in the issue queue is associated with a particular row in the dependency matrix, with the read-after-write (RAW) dependencies noted by bits set on a given column within that row.

As a given resource becomes available, the dependency matrix clears the column associated with that resource, setting all locations in the column to zero. Once a given instruction (row) has all of its RAW dependencies resolved, i.e. once all columns in that row have been set to zero, then the instruction is ready to issue.

As new instructions enter the issue queue, allocation logic assigns the new instructions to a position within the dependency matrix. The dependency matrix logic checks sources for that instruction against a destination register file. A match between an entering instruction's source and a pending instruction's destination indicates that the entering instruction is dependent on the pending entry, and the dependency matrix logic sets the bit in the appropriate position in the dependency matrix. The newly entered instruction will not issue from the issue queue until after the instruction on which it depends has issued, as indicated by the dependency matrix.

Conventional dependency matrices include a single write port and a single read port for each instruction queue. For example, FIG. 1 illustrates a prior art system 100. As shown in FIG. 1, a uni-queue (UQ) dependency matrix 110 couples to a read port 112, a write port 114, and a clear port 116. Dependency matrix 110 tracks dependencies in a uni-queue, and is made up of a number of cells arranged in a matrix (not shown). Write port 114 writes dependency information to the matrix 110 cells and read port 112 reads the stored dependency information from the matrix 110 cells. Clear port 116 clears vertical columns of matrix 110 cells, typically after an instruction executes (thereby satisfying the dependencies associated with the executing instruction).

Prior art system 100 includes another dependency matrix, load miss queue (LMQ) dependency matrix 120. As with matrix 110, matrix 120 couples to a read port 122, write port 124, and clear port 126. Read port 122, write port 124, and clear port 126 perform similar functions as read port 112, a write port 114, and a clear port 116. In a system with many various instruction queues, each with its own dependency matrix, the read, write, and clear ports can consume a relatively large amount of power and take up a relatively large amount of chip space.

Therefore, there is a need for a system and/or method for a dependency matrix that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

A processor having a dependency matrix comprises a first array comprising a plurality of first cells. A second array couples to the first array and comprises a plurality of second cells. A first write port couples to the first array and the second array and writes to the first array and the second array. A first read port couples to the first array and the second array and reads from the first array and the second array. A second read port couples to the first array and reads from the first array. A second write port couples to the second read port, reads from the second read port and writes to the second array.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
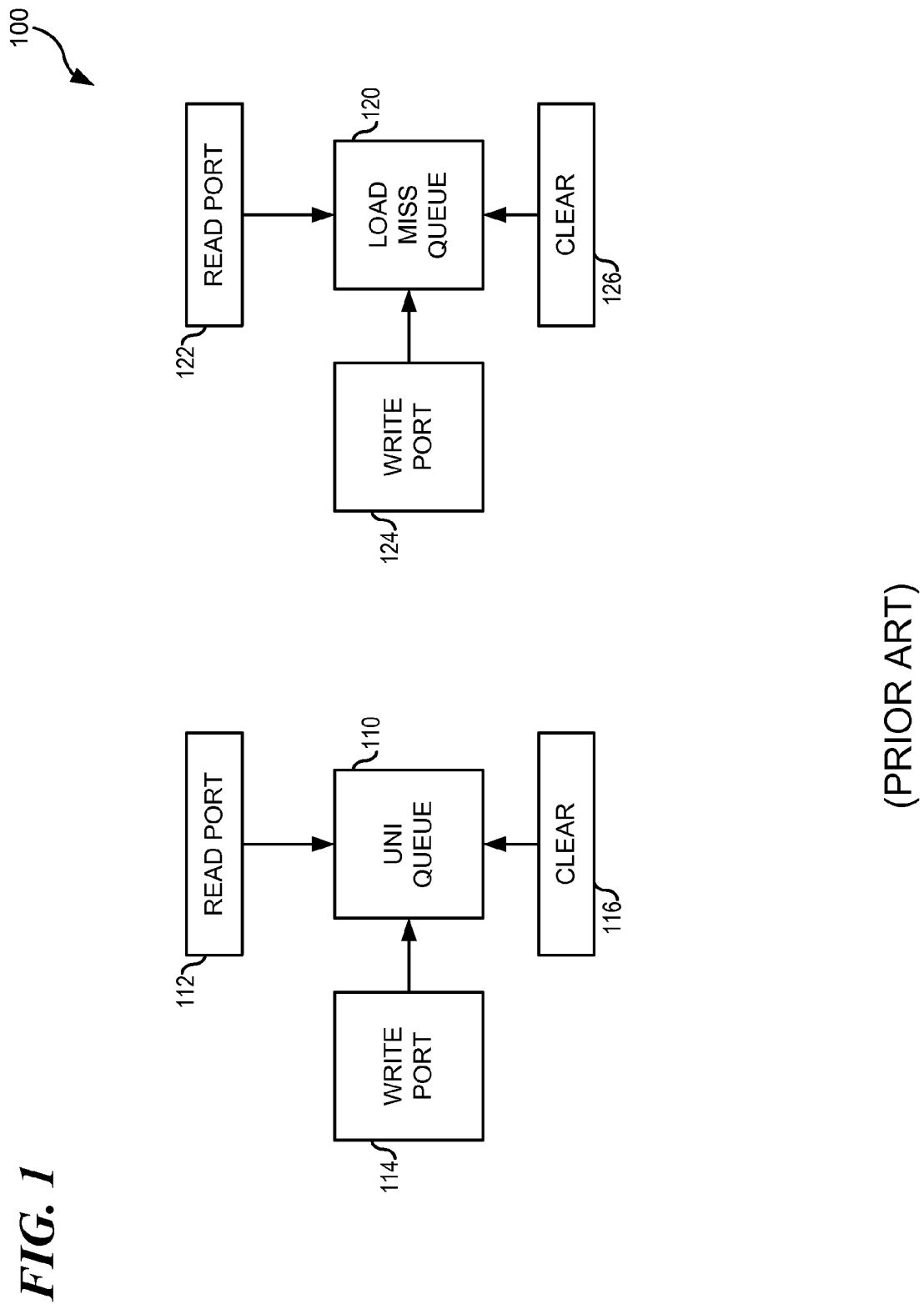
FIG. 1 illustrates a block diagram showing a common instruction dependency tracking system in accordance with the Prior Art.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 2:
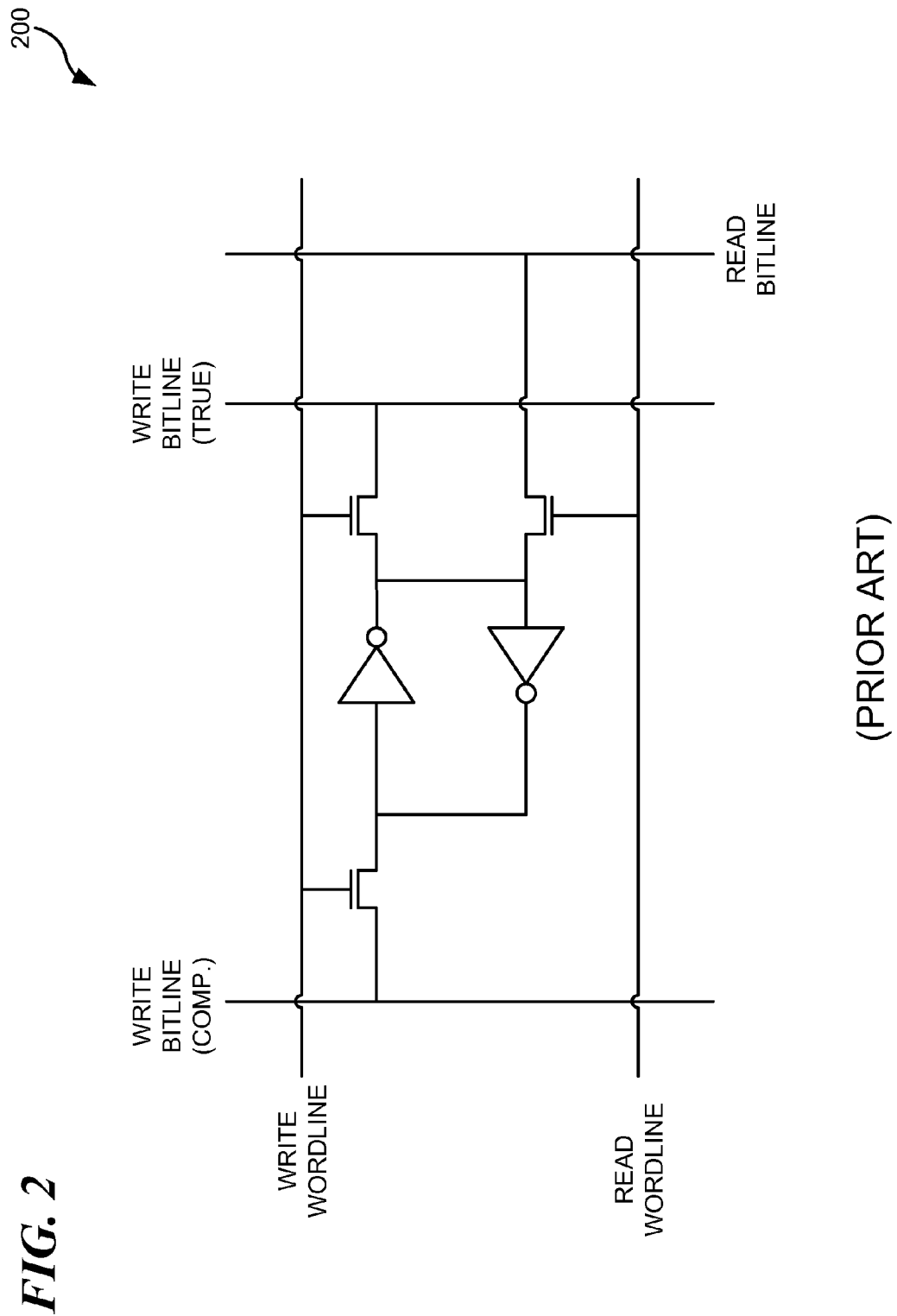
FIG. 2 illustrates a block diagram showing a common instruction dependency tracking system cell in accordance with the Prior Art.

Referring now to the drawings, FIG. 2 illustrates an exemplary dependency matrix registry file cell 200 in accordance with the Prior Art. Generally, a typical dependency matrix consists of a plurality of such cells. Horizontal rows track the dependencies of a single instruction and vertical rows indicate the source instructions on which the dependent instruction depends. The dependency matrix sets and clears each cell as the status of the dependencies change, typically as instructions issue and execute. Cell 200 is shown as a typical general-purpose registry file cell. Cell 200 can be configured for a particular queue, such as a uni-queue (UQ) or a load miss queue (LMQ). As illustrated, cell 200 is shown with a single read port and a single write port. Some dependency matrices can be configured with multiple read and write ports, not shown here. As described above, each additional read or write port consumes chip area and power.

Figure 3:
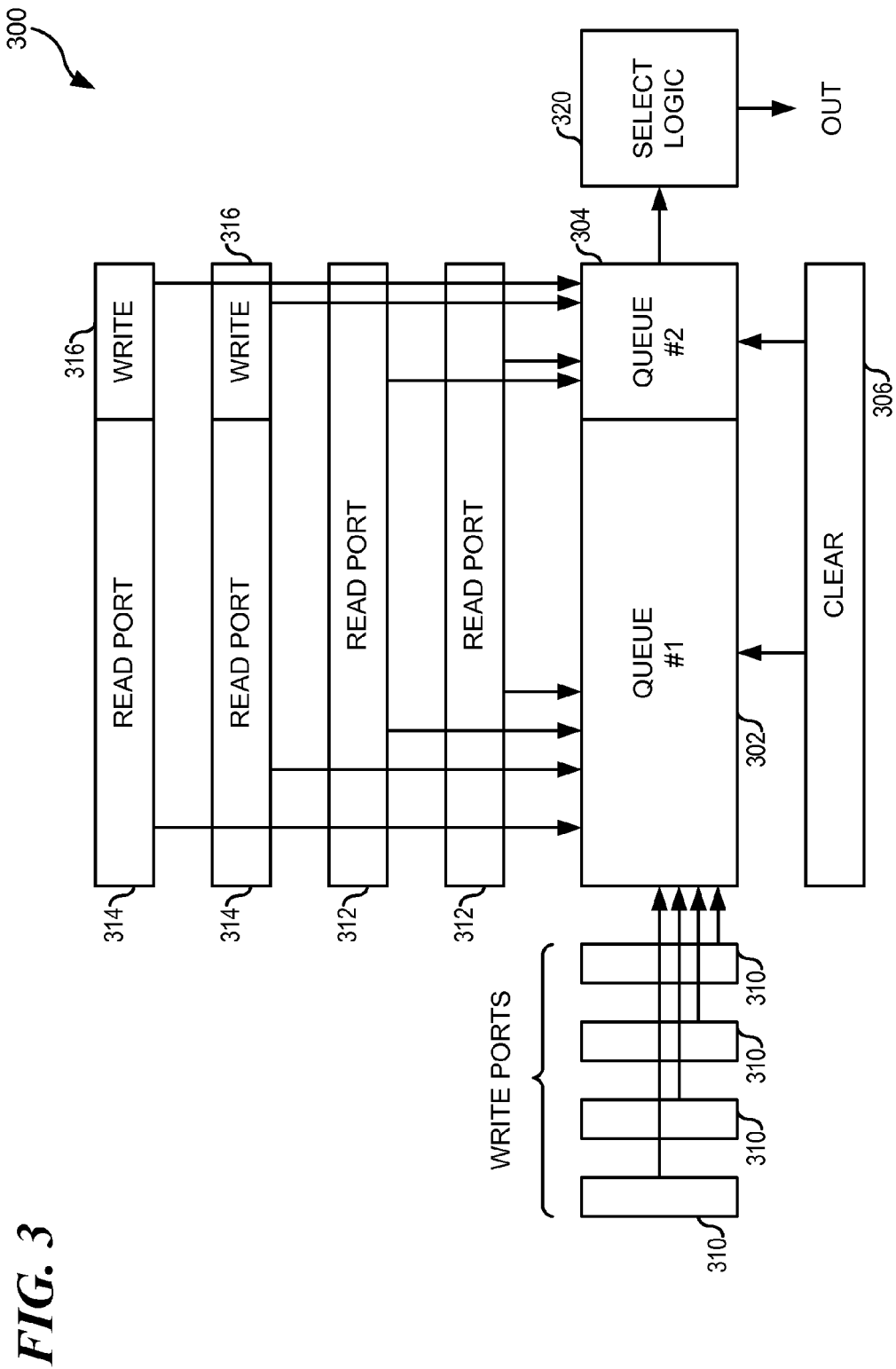
FIG. 3 illustrates a high-level block diagram showing an improved dependency matrix system in accordance with a preferred embodiment.

FIG. 3 illustrates one embodiment of an improved dependency matrix system 300. System 300 includes first queue dependency matrix 302 and second queue dependency matrix 304. Generally, matrix 302 and matrix 304 are otherwise conventional instruction queue dependency matrices, modified as described herein. As illustrated, matrix 302 and matrix 304 form a continuous array of cells. An otherwise conventional clear port 306 couples to matrix 302 and matrix 304 and is configured to clear vertical rows of the matrices. A select logic 320 couples to matrix 302 and matrix 304 and selects between the matrix 302 output and the matrix 304 output. In one embodiment, matrix 302 is a 48-bit wide uni-queue (UQ). In one embodiment, matrix 304 is a 16-bit wide LMQ.

System 300 includes a plurality of write ports 310. Ports 310 are otherwise conventional write ports configured to write horizontally across both matrix 302 and matrix 304. As shown, system 300 includes four write ports. Alternate embodiments can include additional or fewer write ports 310.

System 300 includes a plurality of read ports 312. Ports 312 are otherwise conventional read ports configured to read vertical wordlines of matrix 302 and matrix 304. Generally, the vertical wordlines of matrix 302 and 304 represent the "AVAILABLE" lines, indicating whether a particular instruction's dependencies have been satisfied. As illustrated, each read port 312 reads from multiple matrices. As such, read port 312 saves area and power consumption as compared with prior art systems, wherein each matrix is configured with a separate read port. As shown, system 300 includes two read ports 312. Alternate embodiments can include additional or fewer read ports 312.

System 300 includes a plurality of read ports 314. Ports 314 are otherwise conventional read ports configured to read vertical wordlines of matrix 302 only. As shown, system 300 includes two read ports 314. Alternate embodiments can include additional or fewer read ports 314. Each read port 314 feeds a write port 316.

Figure 4:
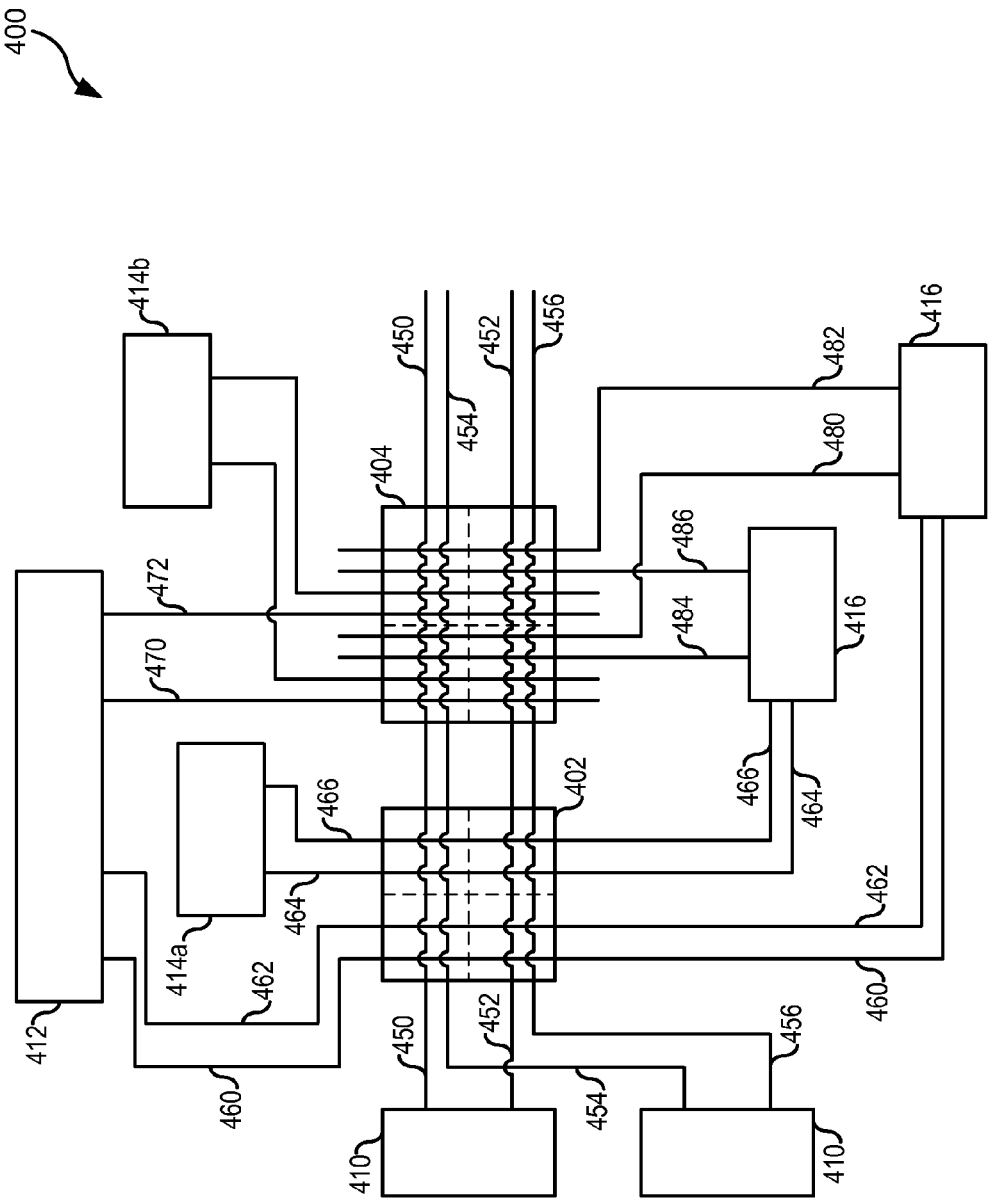
FIG. 4 illustrates a block diagram showing an improved dependency matrix system in accordance with a preferred embodiment.

Write ports 316 are otherwise conventional write ports coupled to matrix 304, modified as described below. Write ports 316 receive input from a read port 314 and write vertically to matrix 304. As shown, six write ports write to matrix 304, four horizontal write ports 310 and two vertical write ports 316. Alternate embodiments can include alternative configurations of read ports 314 and write ports 316. In each case, every read port 314 reads from one of the two matrices and feeds a unique write port 316, which writes to the other of the two matrices. FIG. 4 illustrates this feature in additional detail.

Specifically, FIG. 4 illustrates one embodiment of an improved dependency matrix system. System 400 includes a first queue dependency matrix 402 and second queue dependency matrix 404. Generally, matrix 402 and matrix 404 are otherwise conventional instruction queue dependency matrices, modified as described herein. For ease of illustration, matrix 402 and matrix 404 form a discontinuous array of cells. In an alternate embodiment, matrix 402 and matrix 404 form a continuous array of cells. For ease of illustration, matrix 402 and matrix 404 are each shown with four cells.

One skilled in the art will understand that matrices with many more than four cells can also be employed. For example, in one embodiment, matrix 402 is 48 bits wide (horizontally) and matrix 404 is 16 bits wide (horizontally).

System 400 includes a plurality of write ports 410. Ports 410 are otherwise conventional write ports configured to write horizontally across both matrix 402 and matrix 404. For ease of illustration, system 400 includes two write ports 410. Alternate embodiments can include additional or fewer write ports 410. Ports 410 write to matrix 402 and matrix 404 along one of wordline 450, 452, 454, and 456.

System 400 includes an exemplary read port 412. Port 412 is an otherwise conventional read port configured to read vertical wordlines of matrix 402 and matrix 404. Generally, the vertical wordlines of matrix 402 and 404 represent the "AVAILABLE" lines, indicating whether a particular instruction's dependencies have been satisfied. More particularly, read port 412 reads the vertical wordlines 460 and 462 of matrix 402, and the vertical wordlines 470 and 470 of matrix 404. Thus, as shown, read port 412 reads from multiple matrices, thereby saving chip area and power consumption as compared with prior art systems, wherein each matrix is configured with a separate read port.

In the illustrated embodiment, system 400 also includes single matrix read ports 414. Ports 414 are otherwise conventional read ports, modified as described herein. As shown, read ports 414 read from only one of the two matrices. That is, read port 414a reads the vertical wordlines of only matrix 402 and read port 414b reads the vertical wordlines of only matrix 404.

As shown, read port 414a reads the vertical wordlines 464 and 466 of matrix 402, which feed into a write port 416. Similarly, read port 412 reads the vertical wordlines 460 and 462, which feed into a write port 416. Write ports 416 are otherwise conventional write ports coupled to matrix 404, modified as described below. Specifically, each write port 416 receives input from a read port that reads the vertical wordlines of matrix 402. Write ports 416 write vertically to matrix 304. In one embodiment, write ports 416 feed the read wordlines of matrix 402 as the write bitlines of matrix 404. For example, read wordline 460 becomes write bitline 480, read wordline 462 becomes write bitline 482, read wordline 464 becomes write bitline 484, and read wordline 466 becomes write bitline 486. As such, four write ports write to matrix 404, two horizontal write ports 410 and two vertical write ports 416.

So configured, system 400 provides multiple dependency matrix read and write ports, with reduced area and power consumption as compared to prior art systems providing the same number of read and write ports. As described above, read port 412 saves chip area and reads from multiple dependency matrices. Furthermore, system 400 can write to matrix 404 both vertically and horizontally, providing additional write ports at a fraction of the marginal area and power consumption cost associated with prior art systems.

Thus, generally, the systems 300 and 400 provide dependency matrices with reduced area and power consumption as compared to prior art systems and methods. Accordingly, the disclosed embodiments provide numerous advantages over other methods and systems, as described herein.

For example, in one embodiment, systems 300 and 400 implement the dependency matrix as a register file array. As such, systems 300 and 400 can also be configured to indicate dependencies with a logic high setting, and therefore most of the array contents will tend to remain at logic low (or zero), which is a relatively low power setting. Further, read bitline switching in some embodiments is relatively rare, especially in embodiments where the register file array implements a dynamic read, and therefore such systems spend less power than systems with more frequent bitline switching. Thus, systems 300 and 400 provide relatively lower power dependency matrix implementations.

Additionally, embodiments configured with logic-high dependency indication and reduced read bitline switching also allow multiple active read wordlines. In particular, systems 300 and 400 provide multiple active read wordlines at a relatively lower power than that found in prior art systems. Thus, systems 300 and 400 offer higher performance and reduced power over other approaches.

Furthermore, in one embodiment, systems 300 and 400 can be configured to gate the data with a static clear signal in unison with the dynamic clear port. As such, systems 300 and 400 help reduce unnecessary bitline switching. Reduced bitline switching improves performance by reducing power and improving noise-immunity innovation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A processor embodied at least in part in hardware, the processor having a dependency matrix, the dependency matrix comprising:
   a first array comprising a plurality of first cells;
   a second array coupled to the first array and comprising a plurality of second cells;
   a first write port coupled to the first array and the second array and configured to write to the first array and the second array;
   a first read port coupled to the first array and the second array and configured to read from the first array and the second array;
   a second read port coupled to the first array and configured to read from the first array;
   a second write port coupled to the second read port and configured to read from the second read port and to write to the second array; and
   select logic coupled to the first array and the second array and configured to select between a read output of the first array and a read output of the second array.

2. The processor of claim 1, further comprising a clear port coupled to the first array and the second array and configured to clear a subset of the first cells and the second cells.

3. The processor of claim 1, wherein the first array comprises 48 cells.

4. The processor of claim 1, wherein the second array comprises 16 cells.

5. The processor of claim 1, wherein the first cell is a uni-queue (UQ) cell.

6. The processor of claim 1, wherein the second cell is a load miss queue (LMQ) cell.

7. The processor of claim 1, further comprising:
   a third write port coupled to the first array and the second array and configured to write to the first array and the second array; and
   a third read port coupled to the first array and the second array and configured to read from the first array and the second array.

8. The processor of claim 7, further comprising:
   a fourth write port coupled to the first array and the second array and configured to write to the first array and the second array; and
   a fourth read port coupled to the first array and the second array and configured to read from the first array and the second array.

9. The processor of claim 1, further comprising:
   a third read port coupled to the first array and configured to read from the first array; and
   a third write port coupled to the third read port and configured to read from the second read port and to write to the second array.

10. A processor comprising a dependency matrix for tracking dependencies between instructions, the dependency matrix embodied at least in part in hardware and comprising:
    a first array comprising a plurality of first cells aligned along a vertical axis and a horizontal axis;
    a second array coupled to the first array along the horizontal axis and comprising a plurality of second cells;
    a first write port coupled to the first array and the second array and configured to write to the first array and the second array along the horizontal axis;
    a first read port coupled to the first array and the second array and configured to read from the first array and the second array along the vertical axis;
    a second read port coupled to the first array and configured to read from the first array along the vertical axis;
    a second write port coupled to the second read port and configured to read from the second read port and to write to the second array along the vertical axis; and
    select logic coupled to the first array and the second array and configured to select between a read output of the first array and a read output of the second array.

11. The processor of claim 10, further comprising a clear port coupled to the first array and the second array and configured to clear a subset of the first cells and the second cells along the vertical axis.

12. The processor of claim 10, wherein the first array comprises at least one row of 48 cells arranged along the horizontal axis.

13. The processor of claim 10, wherein the second array comprises at least one row of 16 cells arranged along the horizontal axis.

14. The processor of claim 10, wherein the first cells are uni-queue (UQ) cells.

15. The processor of claim 10, wherein the second cells are load miss queue (LMQ) cells.

16. The processor of claim 10, further comprising:
a third write port coupled to the first array and the second array and configured to write to the first array and the second array along the horizontal axis; and
a third read port coupled to the first array and the second array and configured to read from the first array and the second array along the vertical axis.

17. The processor of claim 16, further comprising:
a forth write port coupled to the first array and the second array and configured to write to the first array and the second array along the horizontal axis; and
a forth read port coupled to the first array and the second array and configured to read from the first array and the second array along the vertical axis.

18. The processor of claim 10, further comprising:
a third read port coupled to the first array and configured to read from the first array along the vertical axis; and
a third write port coupled to the third read port and configured to read from the second read port and to write to the second array along the vertical axis.

* * * * *